(12) United States Patent
Amano et al.

(10) Patent No.: US 7,647,920 B2
(45) Date of Patent: Jan. 19, 2010

(54) FUEL VAPOR TREATMENT SYSTEM

(75) Inventors: Noriyasu Amano, Gamagori (JP);
Mitsuyuki Kobayashi, Anjo (JP)

(73) Assignees: Denso Corporation, Kariya (JP);
Nippon Soken, Inc., Nishio (JP)

( * ) Notice: Subject to any disclaimer, the term of this patent is extended or adjusted under 35 U.S.C. 154(b) by 0 days.

(21) Appl. No.: 12/272,986

(22) Filed: Nov. 18, 2008

(65) Prior Publication Data
US 2009/0133673 A1   May 28, 2009

(30) Foreign Application Priority Data
Nov. 22, 2007   (JP) .............................. 2007-303067

(51) Int. Cl.
*F02M 33/02* (2006.01)
(52) U.S. Cl. ..................... 123/519; 123/520; 180/65.28
(58) Field of Classification Search ................. 123/516, 123/518, 519, 520; 180/65.21, 65.265, 65.28
See application file for complete search history.

(56) References Cited

U.S. PATENT DOCUMENTS

| | | | |
|---|---|---|---|
| 5,751,137 A | 5/1998 | Kiuchi et al. | |
| 6,557,534 B2 | 5/2003 | Robichaux et al. | |
| 6,971,375 B2* | 12/2005 | Amano et al. | 123/520 |
| 7,318,425 B2* | 1/2008 | Kano et al. | 123/520 |
| 7,409,947 B2* | 8/2008 | Koyama | 123/520 |
| 7,565,900 B2* | 7/2009 | Sato et al. | 123/516 |
| 2002/0083930 A1 | 7/2002 | Robichaux et al. | |
| 2005/0022588 A1* | 2/2005 | Hayakawa et al. | 73/118.1 |
| 2006/0042605 A1* | 3/2006 | Amano et al. | 123/520 |
| 2006/0225713 A1 | 10/2006 | Kano et al. | |
| 2007/0295313 A1 | 12/2007 | Amano et al. | |
| 2008/0092858 A1* | 4/2008 | Satoh et al. | 123/520 |
| 2008/0271718 A1 | 11/2008 | Schondorf et al. | |

FOREIGN PATENT DOCUMENTS

| | | |
|---|---|---|
| JP | 05-018326 | 1/1993 |
| JP | 06-101534 | 4/1994 |
| JP | 10-122009 | 5/1998 |
| JP | 2009-18759 | 1/2009 |

OTHER PUBLICATIONS

Japanese Office Action dated Aug. 6, 2009, issued in corresponding Japanese Application No. 2007-303067, with English translation.

* cited by examiner

*Primary Examiner*—Thomas N Moulis
(74) *Attorney, Agent, or Firm*—Nixon & Vanderhye PC

(57) ABSTRACT

A fuel vapor treatment system is mounted on a hybrid vehicle having an internal combustion engine and an electric motor. Even when an internal combustion engine is stopped, a discharge of fuel vapor from a first canister to atmosphere can be detected. When the discharge of the fuel vapor from the first canister is detected, the internal combustion engine is started to perform a purge process. When it is detected that the purge process in the first canister is finished, the internal combustion engine is stopped to terminate the purge process.

3 Claims, 10 Drawing Sheets

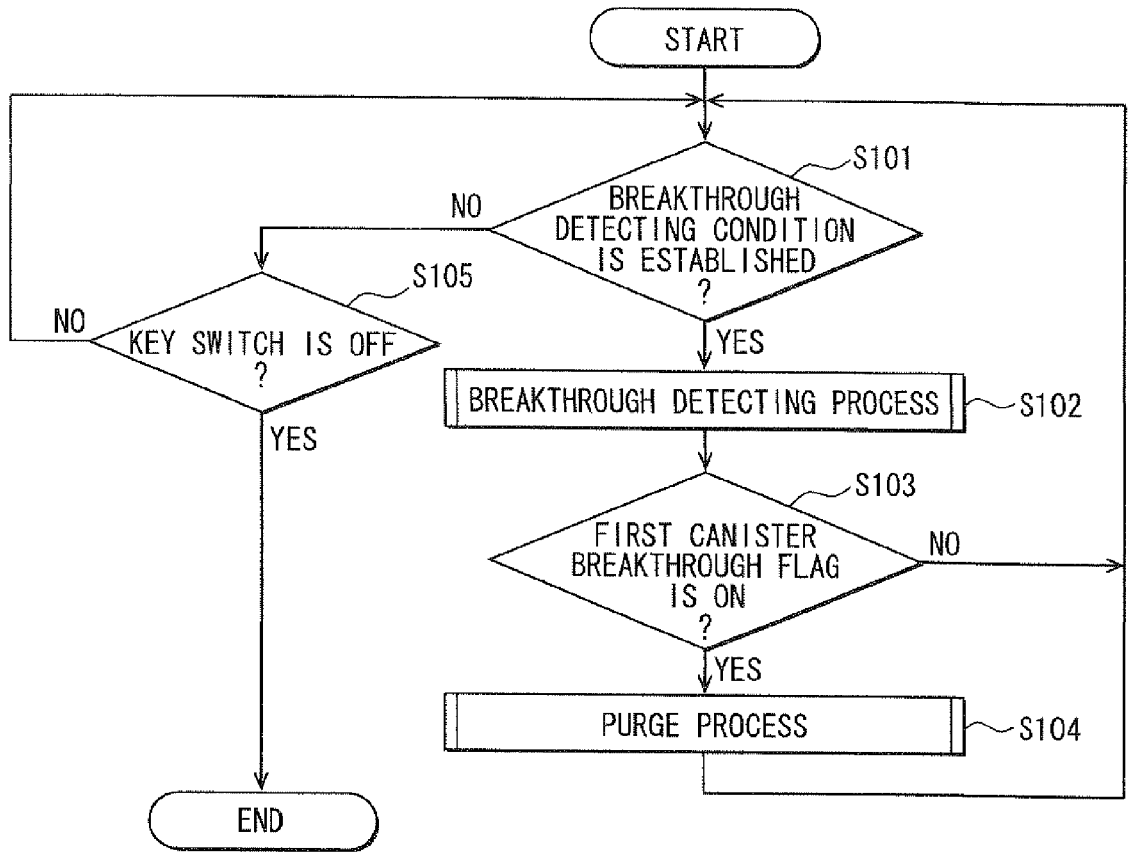

FUEL VAPOR CONCENTRATION IN OPEN-PASSAGE

FUEL VAPOR TREATMENT SYSTEM

CROSS-REFERENCE TO RELATED APPLICATION

This application is based on Japanese Patent Application No. 2007-303067 filed on Nov. 22, 2007, the disclosure of which is incorporated herein by reference.

FIELD OF THE INVENTION

The present invention relates to a fuel vapor treatment system for a hybrid vehicle which has an internal combustion engine and an electric motor for running.

BACKGROUND OF THE INVENTION

Conventionally, JP-5-18326A and JP-6-101534A show a fuel vapor treatment system in which fuel vapor generated in a fuel tank is temporarily adsorbed by a canister and a desorbed fuel vapor is purged into an intake passage of an internal combustion engine with air.

Recently, a plug-in hybrid vehicle has been developed. In the plug-in hybrid vehicle, a battery is charged by an external power source while the vehicle is being parked, and the vehicle is driven by almost the electric motor.

In a case that the plug-in hybrid vehicle is driven by only the electric motor, the internal combustion engine seldom works, so that a purge process in which the desorbed fuel vapor is combusted in the internal combustion engine is hardly performed. If a fuel vapor quantity exceeds a fuel vapor adsorbing capacity of the canister, the fuel vapor may be discharged into the atmosphere to cause air pollution. The situation where the fuel vapor quantity exceeds a fuel vapor adsorbing capacity of the canister is referred to as a breakthrough. Besides, if the internal combustion engine is operated frequently to perform the purge processing, the fuel economy will deteriorate.

SUMMARY OF THE INVENTION

The present invention is made in view of the above matters, and it is an object of the present invention to provide a fuel vapor treatment system for a hybrid vehicle having internal combustion engine and an electric motor, which is able to reduce a driving frequency of the internal combustion engine and to prevent the fuel vapor from being discharged from the canister into the atmosphere.

According to the present invention, a fuel vapor treatment system including:

a first canister temporarily adsorbing a fuel vapor generated in a fuel tank;

an open-passage connecting the first canister with atmosphere;

a purge passage for introducing an air-fuel mixture including the fuel vapor into an intake passage of the internal combustion engine and purging the fuel vapor into the intake passage;

a first detection passage provided with a restrictor therein;

a passage switching valve selectively connecting the first detection passage with one of the open-passage and the purge passage;

a second canister connecting with the first detection passage at an opposite end relative to the passage switching valve across the restrictor in order to adsorb the fuel vapor in the air-fuel mixture which flows therein from the first detection passage;

a second detection passage connecting with the second canister;

a gas-flow producing means connecting with the second detection passage to generate a gas-flow therein;

a pressure detecting means for detecting a pressure determined by the restrictor and the gas-flow producing means;

a fuel vapor discharge detecting means for detecting a discharge of the fuel vapor from the first canister into the atmosphere based on a pressure detected by the pressure detecting means;

a purge completion detecting means for detecting a purge completion of the first canister based on the pressure detected by the pressure detecting means;

a purge starting means for starting the internal combustion engine and starting a purge of the fuel vapor when the fuel vapor discharge detecting means detects the discharge of the fuel vapor from the first canister while the internal combustion engine is stopped; and a purge stopping means for stopping the internal combustion engine and stopping the purge of the fuel vapor when the purge completion detecting means detects the purge completion of the first canister.

According to the present embodiment, when the breakthrough is detected in the first canister, the internal combustion engine is driven to perform the purge process. Thus, a driving frequency of the internal combustion engine is reduced, and it can be avoided to discharge the fuel vapor from the first canister to the atmosphere. Moreover, when the purge completion of the first canister is detected, the internal combustion engine is stopped. Thus, the driving frequency of the internal combustion engine becomes minimum value to avoid the deterioration in fuel economy.

According to another aspect of the present invention, the fuel vapor discharge detecting means detects the discharge of the fuel vapor from the first canister to the atmosphere based on a pressure detected by the pressure detecting means when the passage switching means connects the first detection passage with the open-passage.

According to another aspect of the present invention, the purge completion detecting means detects the purge completion of the first canister based on a pressure detected by the pressure detecting means when the passage switching means connects the first detection passage with the purge passage.

BRIEF DESCRIPTION OF THE DRAWINGS

Other objects, features and advantages of the present invention will become more apparent from the following description made with reference to the accompanying drawings, in which like parts are designated by like reference numbers and in which:

FIG. 3 is a flowchart showing a main operation of the fuel vapor treatment system;

FIG. 4 is a chart showing an operation condition of each valve in the fuel vapor treatment system;

DETAILED DESCRIPTION OF EMBODIMENTS

Figure 1:
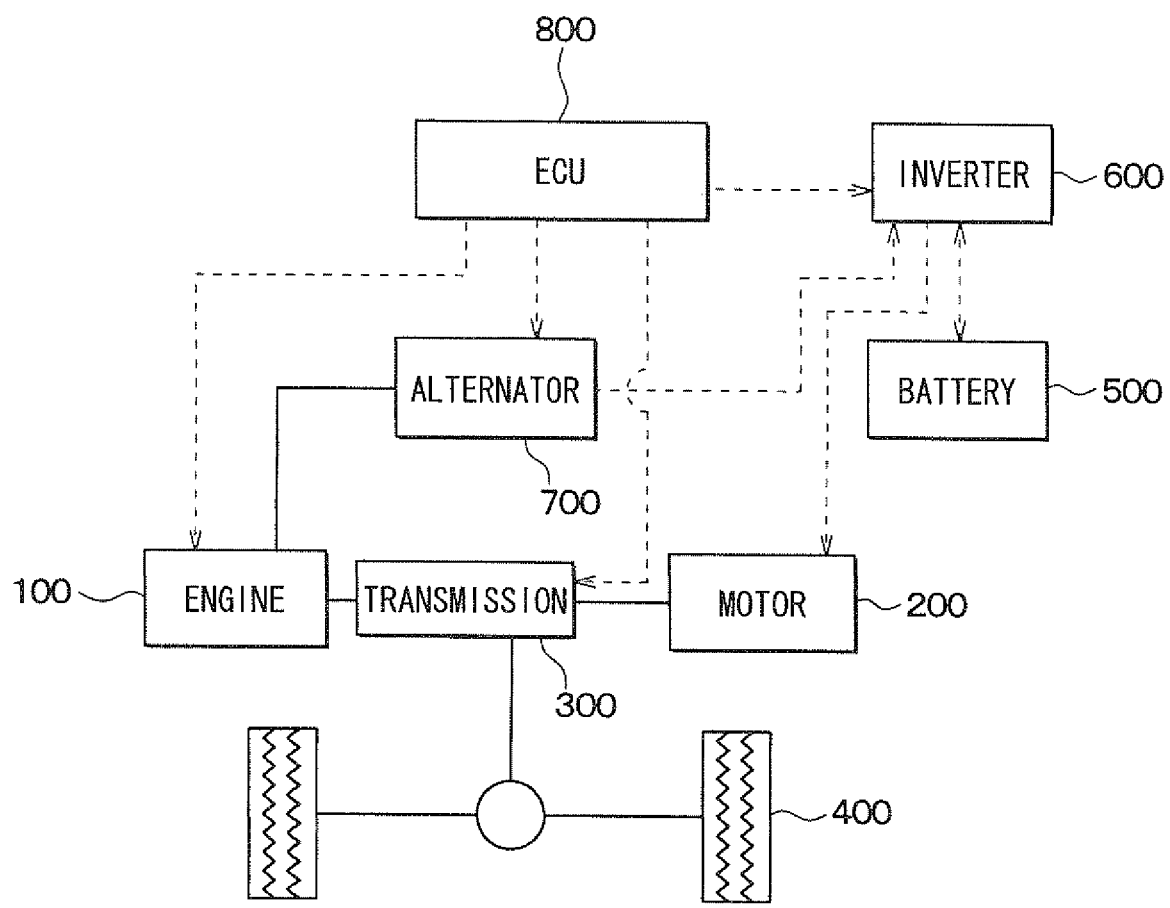
FIG. 1 is a schematic view of a hybrid vehicle on which a fuel vapor treatment system according to an embodiment of the present invention is mounted.

Hereafter, an embodiment of the present invention is described. FIG. 1 is a schematic view of the hybrid vehicle on which a fuel vapor treatment system of the present invention is mounted.

As shown in FIG. 1, the hybrid vehicle is provided with an internal combustion engine 100 and an electric motor 200 for driving the vehicle. The driving force is transmitted to drive wheels 400 through a transmission 300. The electric motor 200 receives electricity from a secondary battery 500 through an inverter 600. The inverter 600 converts direct-current voltage into alternating-current voltage and varies frequency of the alternating-current voltage so that the rotational speed of the motor 200 is controlled.

An alternator 700 driven by the engine 100 generates electricity when the amount of charge of the battery 500 is lowered than a specified value. The electricity generated by the alternator 700 is supplied to the battery 500 through the inverter 600 so that the battery is charged. Moreover, the secondary battery 500 can be charged by an external power source while the vehicle is being parked.

Furthermore, the hybrid vehicle is provided with an electronic control unit (ECU) 800 which controls the engine 100, the transmission 300, the inverter 600, the alternator 700, and a fuel vapor treatment system. The ECU 800 is mainly constructed of a microcomputer having a CPU, a ROM and a RAM.

The hybrid vehicle is driven in a plurality of driving modes. That is, the hybrid vehicle is driven in an engine driving mode where only the engine 100 is a driving source, a motor driving mode where only the motor 200 is the driving source, and a hybrid driving mode where both of the engine 100 and the motor 200 are the driving source.

Figure 2:
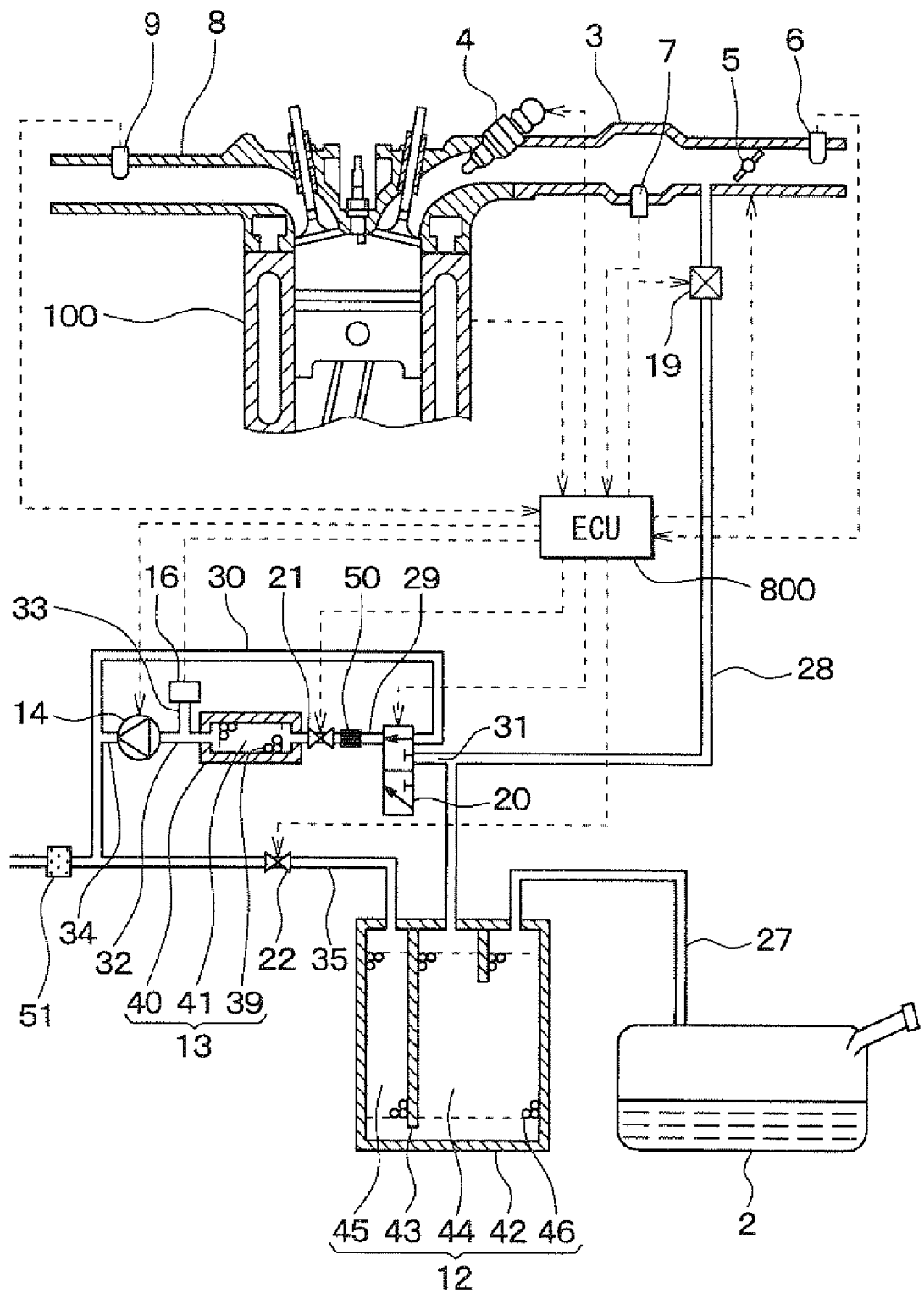
FIG. 2 is a schematic view of a fuel vapor treatment system according to the embodiment.

FIG. 2 shows an internal combustion engine 100 and a fuel vapor treatment system. The engine 100 is a gasoline engine that develops power by use of gasoline fuel received in a fuel tank 2. The intake passage 3 of the engine 100 is provided with, for example, a fuel injection device 4 for controlling a fuel injection quantity, a throttle device 5 for controlling an intake air flow rate, an air flow sensor 6 for detecting the intake air flow rate, an intake pressure sensor 7 for detecting an intake pressure, and the like. Moreover, the discharge passage 8 of the engine 100 is provided with an air-fuel ratio sensor 9 for detecting an air-fuel ratio.

The fuel vapor treatment system treats fuel vapor produced in the fuel tank 2 and supplies the fuel vapor to the engine 100. The fuel vapor treatment system is provided with a first canister 12, a second canister 13, a pump 14, a differential pressure sensor 16, a plurality of valves 19 to 22, a plurality of passages 27 to 35 and the ECU 800.

In the first canister 12, a case 42 is partitioned by a partition wall 43 to form two adsorption parts 44, 45. The adsorption parts 44, 45 are respectively packed with adsorptive agents 46 made of activated carbon or the like. The main adsorption part 44 is provided with an introduction passage 27 connecting with the inside of the fuel tank 2. Hence, fuel vapor produced in the fuel tank 2 flows into the main adsorption part 44 through the introduction passage 27 and is adsorbed by the adsorptive agent 46 in the main adsorption part 44. The main adsorption part 44 is further provided with a purge passage 28 connecting with the intake passage 3.

A purge valve 19, which is an electromagnetically driven two-way valve, is provided in the purge passage 28. The purge valve 19 is opened/closed to control the connection between the first canister 12 and the intake passage 3. With this, in a state where the purge valve 19 is opened, negative pressure developed downstream of the throttle device 5 of the intake passage 3 is applied to the main adsorption part 44 through the purge passage 28. Therefore, when the negative pressure is applied to the main adsorption part 44, fuel vapor is desorbed from the adsorptive agent 46 in the main adsorption part 44 and the desorbed fuel vapor is mixed with air and is introduced into the purge passage 28, whereby fuel vapor in the air-fuel mixture is purged to the intake passage 3. The fuel vapor purged into the intake passage 3 through the purge passage 28 is combusted in the engine 100 along with fuel injected from the fuel injection device 4.

The main adsorption part 44 connects with a subordinate adsorption part 45 via a space at the inside bottom of the case 42. When the purge valve 19 is opened, negative pressure generated in the intake pipe 3 is introduced into the subordinate adsorption part 45 through the purge passage 28 and the main adsorption part 44. An open-passage 35 is connected to the subordinate adsorption part 45. The open-passage 35 is provided with a canister-close valve 22 which is an electromagnetic valve. The open-passage 35 communicates to the atmosphere at the other end thereof. Therefore, in a state where the canister-closing valve 22 is opened, the subordinate adsorption part 45 is open to the atmosphere through the open-passage 35. The open-passage 35 is provided with a filter 51 between the canister-close valve 35 and its opening end.

A passage switching valve 20 is an electromagnetic valve that performs a two-position action. The passage switching valve 20 can be mechanically connected to one end of a first detection passage 29, and can be mechanically connected to one end of an atmosphere passage 30. The other end of the atmosphere passage 30 is connected to the open-passage 35 between the canister-close valve 22 and the filter 35. Thereby, the atmosphere passage 30 communicates to the atmosphere through the open-passage 35. Moreover, the passage switching valve 20 is mechanically connected to a branch passage 31 branched from the purge passage 28 between the main adsorption part 44 and the purge valve 19. The passage switching valve 20 selectively changes a passage connecting with the first detection passage 29 between the atmosphere passage 30 and the branch passage 31. Therefore, in a first position where the atmosphere passage 30 connects with the first detection passage 29, the air in the atmosphere passage 30 can flow into the first detection passage 29. Moreover, in a second position where the branch passage 31 connects with the first detection passage 29, the air-fuel mixture containing the fuel vapor in the purge passage 28 can flow into the first detection passage 29.

The pump 14, which is a gas flow generating means, is constructed of, for example, an electrically driven vane pump. The suction port of the pump 14 connects with one end of a second detection passage 32, and the discharge port of the pump 14 connects with one end of a discharge passage 34. The other end of the discharge passage 34 connects with the atmosphere passage 30. The discharge port of the pump 14 connects with the atmosphere through the discharge passage 34, the atmosphere passage 30 and the open-passage 35. When energized, the pump 14 decompresses the second detection passage 32 to generate the gas flow in the second detection passage 32. The generated gas flow is discharged into the discharge passage 34. When the pump 14 is stopped, the second detection passage 32 and the discharge passage 34 are communicated with each other through an interior of the pump 14.

A second canister 13 has an adsorption part 41 in a case 40 packed with an adsorptive agent 39 made of activated carbon or the like. The total capacity of the adsorptive agent 39 in the second canister 13 is established smaller than the total capacity of the adsorptive agent 46 in the first canister 12. The first detection passage 29 connects with the second detection passage 32 through the adsorption part 41. Hence, when the pump 14 is operated in a state where the air-fuel mixture exists in the first detection passage 29, the negative pressure generated in the second detection passage 32 is introduced into the first detection passage 29 through the second canister 13, so that the air-fuel mixture in the first detection passage 29 flows into the adsorption part 41 and fuel vapor in the air-fuel mixture is adsorbed by the adsorptive agent 39 in the adsorption part 41. In a case that the purge valve 19 is opened and the passage switching valve 20 is positioned in the second position, when the negative pressure in the intake passage 3 is introduced into the first detection passage 29 through the purge passage 28 and the branch passage 31, the air is introduced from the atmosphere passage 30 toward the pump 14. Thus, the fuel vapor adsorbed in the adsorptive agent 39 is desorbed. The desorbed fuel vapor is purged into the intake passage 3 through the first detection passage 29 and the purge passage 28.

A restrictor 50 which restricts a passage area is provided in the first detection passage 29. Moreover, a passage opening/closing valve 21 made of an electromagnetically driven two-way valve is provided in the middle portion of the first detection passage 29 between the second canister 13 and the restrictor 50. The passage opening/closing valve 21 opens or closes the first detection passage 29. That is, when the passage opening/closing valve 21 is closed, the first detection passage 29 is closed between the restrictor 50 and the second canister 13. When the passage opening/closing valve 21 is opened, the first detection passage 29 is opened.

The differential pressure sensor 16 connects with a pressure introducing passage 33 branched from the second detection passage 32 between the second canister 13 and the pump 14. The differential pressure sensor 16 detects a pressure difference between pressure in the second detection passage 32 and the atmospheric pressure. Therefore, a differential pressure detected by the differential pressure sensor 16 when the pump 14 is operated is substantially equal to the pressure difference between both ends of the restrictor 50 in a state where the passage opening/closing valve 21 is opened. Moreover, in a state where the passage opening/closing valve 21 is closed, the first detection passage 29 is closed on the suction side of the pump 14. Hence, a pressure difference detected by the differential pressure sensor 16 when the pump 14 is operated is substantially equal to the shutoff pressure of the pump 14. As described above, the differential pressure sensor 16 can detect pressure which is determined based on the restrictor 50 and the pump 14.

The ECU 800 is comprised of a microcomputer having a CPU and a memory, and is electrically connected to the pump 14, the differential pressure sensor 16, the valves 19-22, and the elements 4-7, 9 of the engine 100. The ECU 800 controls the respective operations of the pump 14 and the valves 19 to 22 on the basis of the detection results of the respective sensors 16, 6, 7, 9, a temperature of cooling water of the engine 100, a temperature of working oil of the vehicle, a rotational speed of the engine 100, the accelerator position of the vehicle, the ON/OFF state of an ignition switch, and the like. Further, the ECU 800 controls a fuel injection quantity, an opening degree of a throttle valve 5, an ignition timing of the engine 100, and the like.

Referring to FIG. 3, a main operation of the fuel vapor treatment system will be described, FIG. 3 is a flowchart which the ECU 800 executes. The main operation is started when the ignition switch is turned ON. When the ignition switch is ON, the engine 100 and/or the electric motor 200 can drive the vehicle. When the ignition switch is OFF, the operations of the engine 100 and the electric motor 200 are prohibited.

In step S101, the computer determines whether a breakthrough detecting condition for the first canister 12 is established. Specifically, when an elapsed time after the previous breakthrough detecting process is completed exceeds a first preset time, the breakthrough detecting condition is established.

When the answer is YES in step S101, the procedure proceeds to step S102 in which the breakthrough detecting process is performed for determining whether the first canister 12 is in a situation of the breakthrough. Then, the procedure proceeds to step S103 in which the computer determines whether a first canister breakthrough flag is set as ON, which indicates the first canister is in the situation of the breakthrough. When the answer is YES in step S103, the procedure proceeds to step S104 in which a purge process is performed to combust the fuel vapor desorbed from the first canister 12 and the second canister 13. Then, the procedure goes back to step S101. When the answer is NO in step S103, the procedure goes back to step S201.

When the answer is NO in step S101, the procedure proceeds to step S105. In step S105, the computer determines whether the key switch is OFF. When the key switch is ON, the procedure goes back to step S101. When the key switch is OFF, the procedure is terminated. In the fuel vapor treatment system, after the main operation is finished, a first canister opening operation that brings the respective valves 19 to 22 to the states shown in FIG. 4 is performed to open the first canister 12 to the atmosphere.

Figure 5:
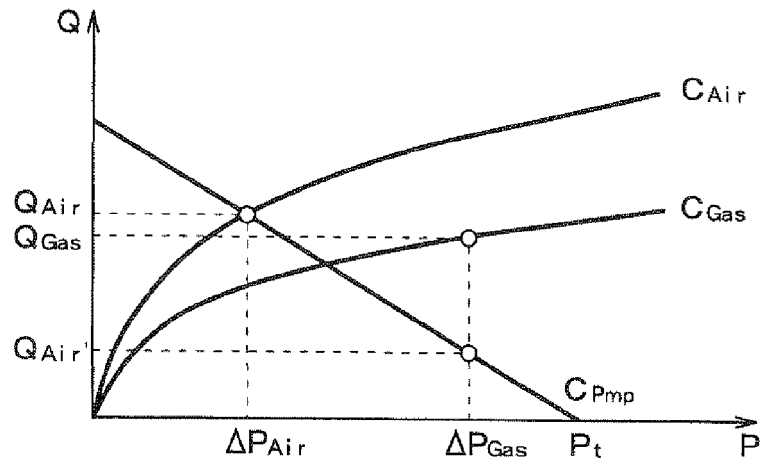
FIG. 5 is a characteristic graph for describing the principle of the present invention.

The breakthrough detection process in step S102 will be described in more detail. First, the measurement principle of the fuel vapor concentration "D" that is a parameter for the breakthrough detection will be described. For example, in a case of the pump 14 having internal leak such as a vane pump, the quantity of internal leak varies according to load. Hence, as shown in FIG. 5, the pressure (P)–flow rate (Q) characteristic curve $C_{pmp}$ of the pump 14 is expressed by a following equation (1). In the equation (1), K1 and K2 are constants specific to the pump 14.

$$Q = K1 \cdot P + K2 \qquad (1)$$

Assuming that the shutoff pressure of the pump 14 is Pt, the flow rate Q becomes zero and following equation (2) is obtained.

$$K2 = -K1 \cdot Pt \quad (2)$$

In the fuel vapor treatment system, the pressure loss of flowing gas is reduced to as small a quantity as can be neglected on a side closer to the second canister 13 and the second detection passage 32 than the restrictor 50 of the first detection passage 29. In a state where the passage opening/closing valve 21 is opened, the pressure P of the pump 14 is thought to be substantially equal to a differential pressure ΔP between both ends of the restrictor 50 (hereinafter simply referred to as "differential pressure"). When the pressure loss of flowing gas cannot be neglected, it is preferable that the pressure loss is previously stored in the ECU 800 and the differential pressure ΔP is corrected as required.

When the passage opening/closing valve 21 is opened and only air passes through the restrictor 50; the air passes through the second canister 13 to be suctioned by the pump 14. Thus, the passing air flow rate $Q_{Air}$ is substantially equal to the intake air flow rate Q. Therefore, the flow rate $Q_{Air}$ and the differential pressure $\Delta P_{Air}$ when air passes through the restrictor 50 satisfy the following relationship equation (3) obtained from the equations (1), (2).

$$Q_{Air} = K1 \cdot (\Delta P_{Air} - Pt) \quad (3)$$

Meanwhile, when the air-fuel mixture containing fuel vapor (hereinafter simply referred to as "air-fuel mixture") passes through the restrictor 50 in a state where the passage opening/closing valve 21 is open, the second canister 13 passes only air and hence the passing air flow rate $Q_{Air}'$ in the air-fuel mixture is substantially equal to the suction airflow rate Q of the pump 14. Therefore, when the air-fuel mixture passes through the restrictor 50, the passing flow rate $Q_{Air}'$ and the differential pressure $\Delta P_{Gas}$ satisfy the following equation (4) obtained by the equations (1) and (2).

$$Q_{Air}' = K1 \cdot (\Delta P_{Gas} - Pt) \quad (4)$$

When it is assumed that the passing flow rate of the whole air-mixture at the restrictor 50 is $Q_{Gas}$ and the fuel vapor concentration is D (%), the passing air flow rate $Q_{Air}'$ satisfies the following equation (5). Hence, the following equation (6) can be obtained from this equation (5).

$$Q_{Air}' = Q_{Gas} \cdot (1 - D/100) \quad (5)$$

$$D = 100 \cdot (1 - Q_{Air}'/Q_{Gas}) \quad (6)$$

The differential pressure ΔP–flow rate Q characteristic curve at the restrictor 50 is expressed by the following equation (7) using the density p of the gas passing through the restrictor 50. "K3" in the equation (7) is a constant specific to the restrictor 50 and is a value expressed by the following equation (8) when the diameter and the flow coefficient of the restrictor 50 are assumed to be "d" and "α", respectively.

$$Q = K3 \cdot (\Delta P/\rho)^{1/2} \quad (7)$$

$$K3 = \alpha \cdot \pi \cdot d^2/4 \cdot 2^{1/2} \quad (8)$$

Therefore, the ΔP–Q characteristic curve $C_{Air}$ shown in FIG. 5 is expressed by the following equation (9) using the density $\rho_{Air}$ of air.

$$Q_{Air} = K3 \cdot (\Delta P_{Air}/\rho_{Air})^{1/2} \quad (9)$$

Moreover, the ΔP–Q characteristic curve $C_{Gas}$ of the air-fuel mixture shown in FIG. 5 is expressed by the following equation (10) by the use of the density $\rho_{Gas}$ of the air-fuel mixture. When it is assumed that the density of hydrocarbon (HC) of the fuel vapor is $\rho_{HC}$, there is a relationship expressed by the following relationship equation (11) between the density $\rho_{Gas}$ of the air-fuel mixture and the fuel vapor concentration D (%) in the air-fuel mixture.

$$Q_{Gas} = K3 \cdot (\Delta P_{Gas}/\rho_{Gas})^{1/2} \quad (10)$$

$$D = 100 \cdot (\rho_{Air} - \rho_{Gas})/(\rho_{Air} - \rho_{HC}) \quad (11)$$

From the above-mentioned equations, by eliminating K1 from the equations (3) and (4), the following equation (12) is obtained. Moreover, by eliminating K3 from the equations (9) and (10), the following equation (13) is obtained.

$$Q_{Air}/Q_{Air}' = (\Delta P_{Air} - Pt)/(\Delta P_{Gas} - Pt) \quad (12)$$

$$Q_{Air}/Q_{Gas} = \{(\Delta P_{Air}/\Delta P_{Gas}) \cdot (\rho_{Gas}/\rho_{Air})\}^{1/2} \quad (13)$$

Furthermore, by eliminating $Q_{Air}$ from the equations (12) and (13), the following equation (14) is obtained, and the following equation (15) is obtained from the equation (11). Hence, the following equation (16) is obtained from these equations (14), (15), and (6). P1, P2, and ρ in the equation (16) are expressed by the following equations (17), (18), and (19).

$$Q_{Air}'/Q_{Gas} = (\Delta P_{Gas} - Pt)/(\Delta P_{Air} - Pt) \cdot \{(\Delta P_{Air}/\Delta P_{Gas}) \cdot (\rho_{Gas}/\rho_{Air})\}^{1/2} \quad (14)$$

$$\rho_{Gas} = \rho_{Air} - (\rho_{Air} - \rho_{HC}) \cdot D/100 \quad (15)$$

$$D = 100 \cdot [1 - P1\{P2 \cdot (1 - \rho \cdot D)\}^{1/2}] \quad (16)$$

$$P1 = (\Delta P_{Gas} - Pt)/(\Delta P_{Air} - Pt) \quad (17)$$

$$P2 = \Delta P_{Air}/\Delta P_{Gas} \quad (18)$$

$$\rho = (\rho_{Air} - \rho_{HC})/(100 \cdot \rho_{Air}) \quad (19)$$

When both sides of the equation (16) are squared and rearranged for D, the following quadratic equation (20) is obtained. When this quadratic equation (20) is solved for D, the following solution (21) is obtained. M1 and M2 in the solution (21) are expressed by the following equations (22) and (23).

$$D2 + 100 \cdot (100 \cdot P1^2 \cdot P2 \cdot \rho - 2) \cdot D + 100^2 \cdot (1 - P1^2 \cdot 2) \quad (20)$$

$$D = 50 - \{-M1 \pm (M1^2 - 4 \cdot M2)^{1/2}\} \quad (21)$$

$$M1 = 100 \cdot P1^2 \cdot P2 \cdot \rho - 2 \quad (22)$$

$$M2 = 1 - P1^2 \cdot P2 \quad (23)$$

Therefore, because a value beyond a range from 0 to 100 of the solutions (21) of the quadratic equation (20) does not hold as the concentration D of fuel vapor, a value within the range from 0 to 100 of the solutions (21) is obtained as the equation (24) of computing the concentration D of fuel vapor.

$$D = 50 \cdot \{-M1 - (M1^2 - 4 \cdot M2)^{1/2}\} \quad (24)$$

In the equation (24) of computing the concentration D of fuel vapor obtained in this manner, among variables included in M1 and M2, $\rho_{Air}$ and $\rho_{HC}$ are values determined as physical constants and are stored as parts of the equation (24) in the memory of the ECU 800 in this embodiment. Therefore, to compute the concentration D of fuel vapor by the use of the equation (24), among variables included in M1 and M2, the differential pressure $\Delta P_{Air}$, $\Delta P_{Gas}$ when air and air-fuel mixture pass through the restrictor 50 and the shutoff pressure Pt of the pump 14 are necessary. Since each of the differential pressure $\Delta P_{Air}$, $\Delta P_{Gas}$ is substantially equal to the pressure detected by the pressure sensor 16, in the breakthrough detection process in step S102, the pressure differences $\Delta P_{Air}$, $\Delta P_{Gas}$ and the shutoff pressure Pt are detected and the concentration D of fuel vapor is computed from these detected values.

Figure 6:
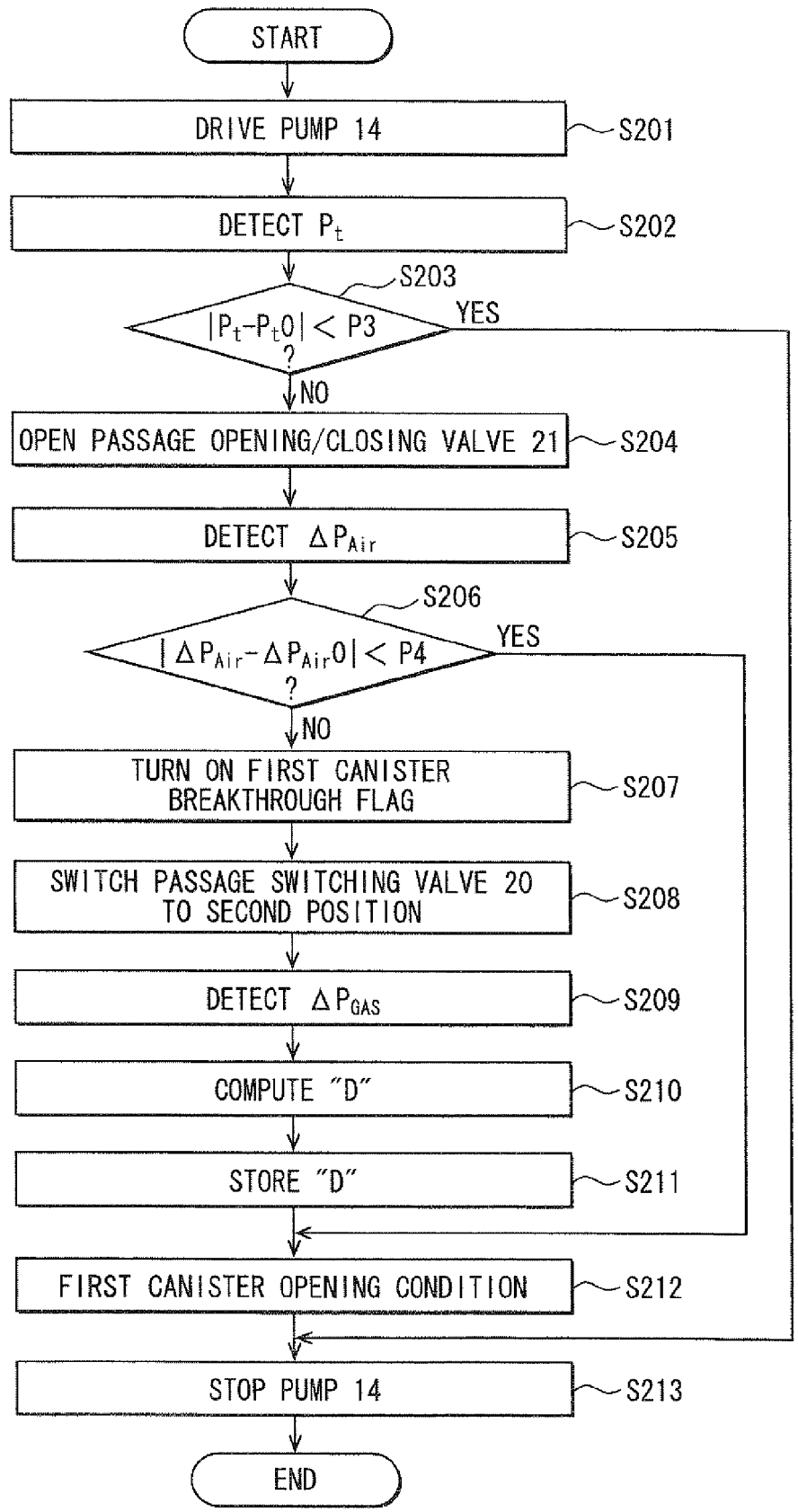
FIG. 6 is a flowchart showing a breakthrough detection process in the fuel vapor treatment system.

FIG. 6 is a flowchart showing the breakthrough detection process which the ECU800 executes. At a starting of the breakthrough detection process, as shown in a column of "FIRST CANISTER OPENING CONDITION" in FIG. 4, the purge valve 19 and the passage opening/closing valve 21 are closed, the passage switching valve 20 is in the first position, and the canister-close valve 22 is opened, so that the first canister 12 connects with the atmosphere.

Figure 7:
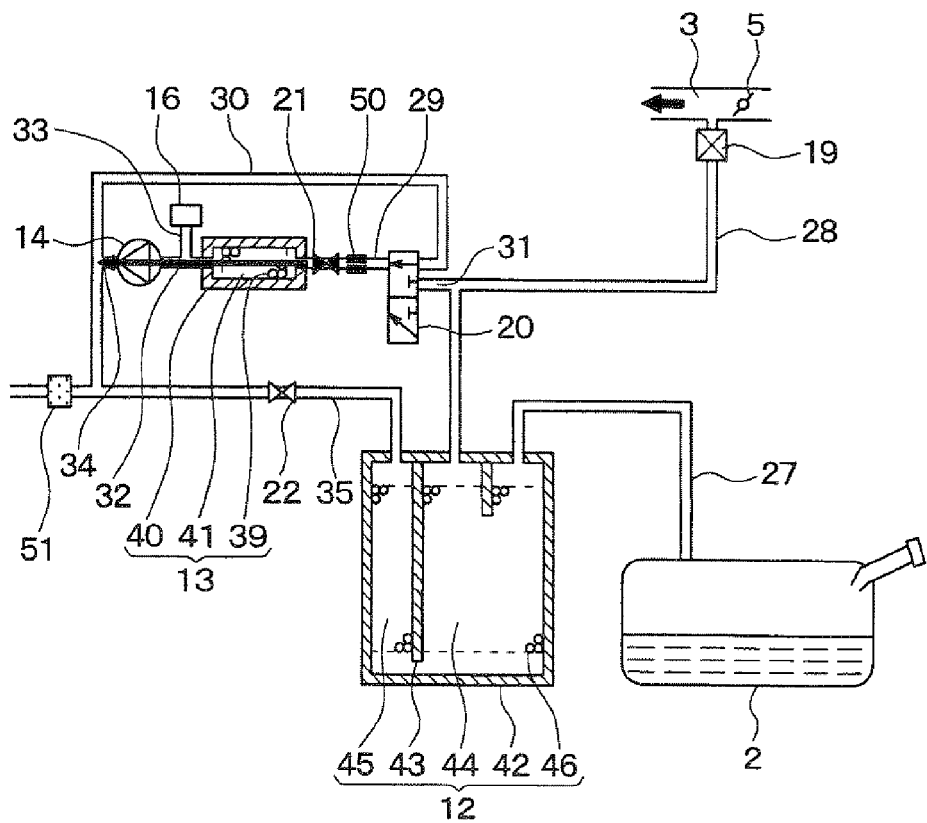
FIG. 7 is a schematic view for explaining the breakthrough detection process in the fuel vapor treatment system.

In step S201, the pump 14 is driven to decompress the second detection passage 32. At this time, each valve 19-22 is the same state as the first canister opening condition as shown in a column of "S201" in FIG. 4. Thereby, since the first detection passage 29 is closed as shown in FIG. 7, the pressure detected by the pressure sensor 16 is varies to the shutoff pressure Pt. Then, in this step S202, when the differential pressure detected by the pressure sensor 16 becomes stable, the stable value is stored as the shutoff pressure Pt of the pump 14 in the memory of the ECU 800.

Then, the procedure proceeds to step S203 in which the computer determines whether a difference between the shutoff pressure Pt and a reference shutoff pressure Pt0 is smaller than a permissible value P3 in order to determine whether the first canister 12 is in the situation of the breakthrough.

Figure 8:
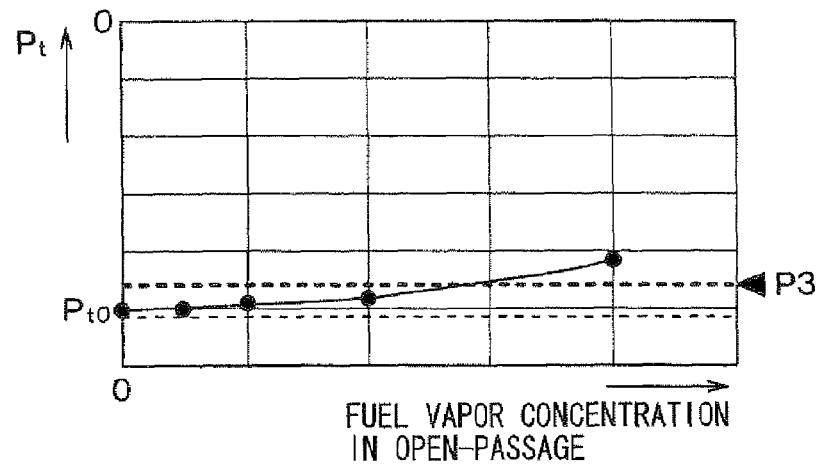
FIG. 8 is a characteristic graph for explaining the breakthrough detection process in the fuel vapor treatment system.

When the fuel vapor passes through the first canister 12 and flows into the pump 14 through the atmosphere passage 30 and the discharge passage 34, a situation of an internal leak in the pump 14 will be varied due to a variation in viscosity of gas. As shown in FIG. 8, as the fuel vapor concentration in the open-passage 35 increases, the shutoff pressure Pt detected by the pressure sensor 16 increases. That is, the shutoff pressure Pt varies toward the atmospheric pressure. When the answer is NO in step S203, the computer determines that the first canister 12 is in a situation of the breakthrough. The procedure proceeds to step S204.

Figure 9:
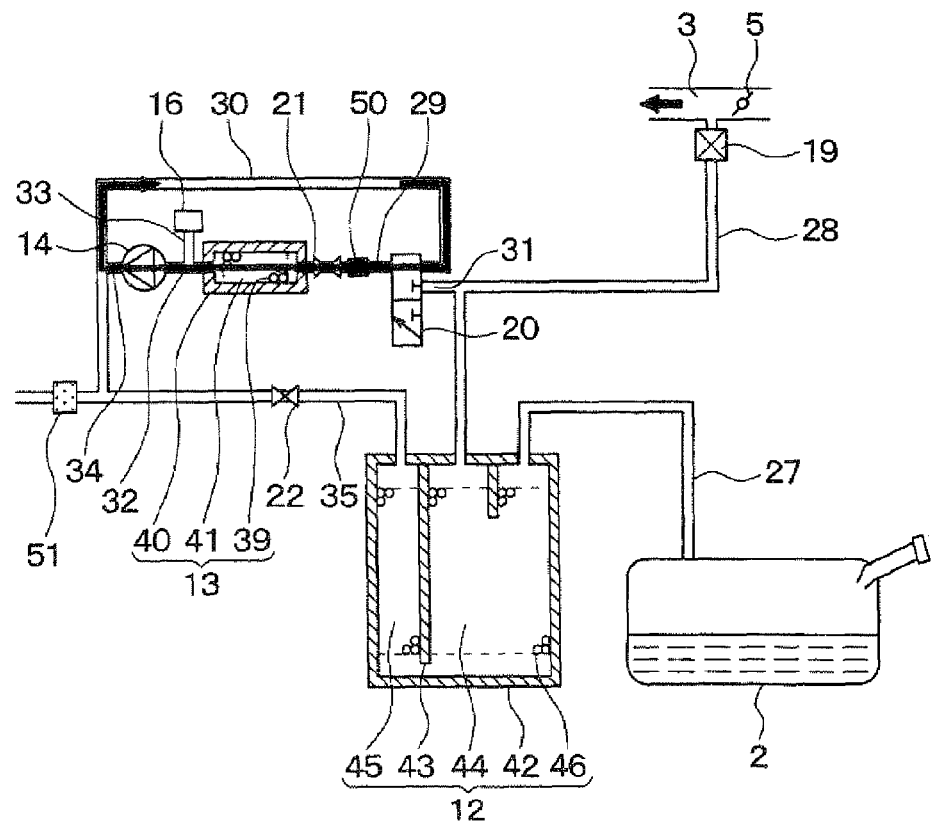
FIG. 9 is a schematic view for explaining the breakthrough detection process in the fuel vapor treatment system.

In step S204, while the pump 14 is driven, the passage opening/closing valve 21 is opened. Since the condition of each valves 19-22 will be in the condition shown in the column of "S204" in FIG. 4, the second detection passage 32, which is decompressed by the pump 14, is communicated with the first detection passage 29, the atmosphere passage 30 and the open-passage 35, so that the air passes through the restrictor 50 as shown in FIG. 9. Then, the procedure proceeds to step S205. In this step S205, when the differential pressure detected by the differential pressure sensor 16 becomes stable, the stable value is stored in the memory of the ECU 800 as a first differential pressure $\Delta P_{Air}$.

Then, the procedure proceeds to step S206 in which the computer determines whether a difference between the first differential pressure $\Delta P_{Air}$ and the first reference differential pressure $\Delta P_{Air}0$ is less than a permissible value P4 in order to determine whether the first canister 12 is in the situation of the breakthrough. Besides, the first reference differential pressure $\Delta P_{Air}0$ corresponds to a pressure detected by the pressure sensor 16 when the air containing no fuel vapor passes through the restrictor 50.

Figure 10:
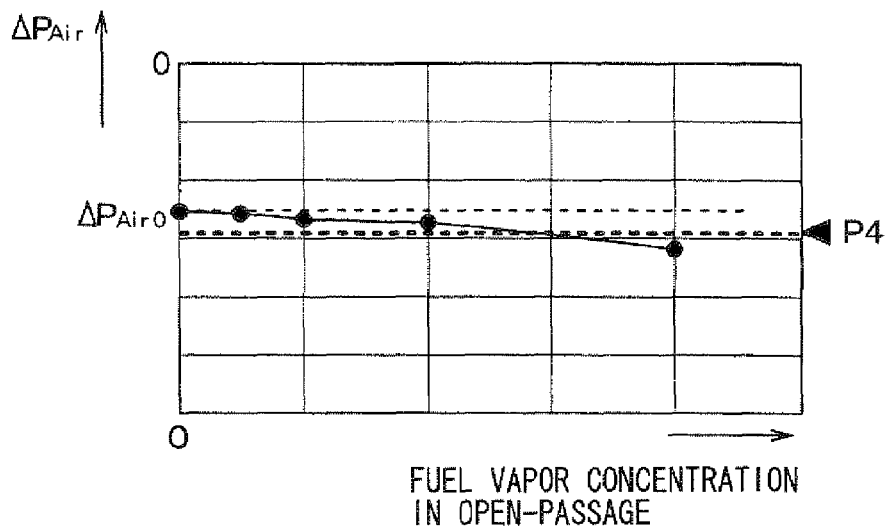
FIG. 10 is a characteristic graph for explaining the breakthrough detection process in the fuel vapor treatment system.

When the first canister 12 is in the situation of the breakthrough, the fuel vapor exists in the atmosphere passage 30 and the open-passage 35. Thus, the density of the gas passing through the restrictor 50 is varied. As shown in FIG. 10, as the fuel vapor concentration in the open-passage 35 increases, the first differential pressure $\Delta P_{Air}$ detected by the pressure sensor 16 decreases. When the answer is NO in step S206, the computer determines that the first canister 12 is in the situation of the breakthrough.

Then, the procedure proceeds to step S207 in which a fist canister breakthrough flag is tuned ON which indicates the first canister 12 is in the situation of the breakthrough. Since the computer determines whether the first canister 12 is in the situation of the breakthrough in both of steps S203, S206, an erroneous determination can be avoided.

Figure 11:
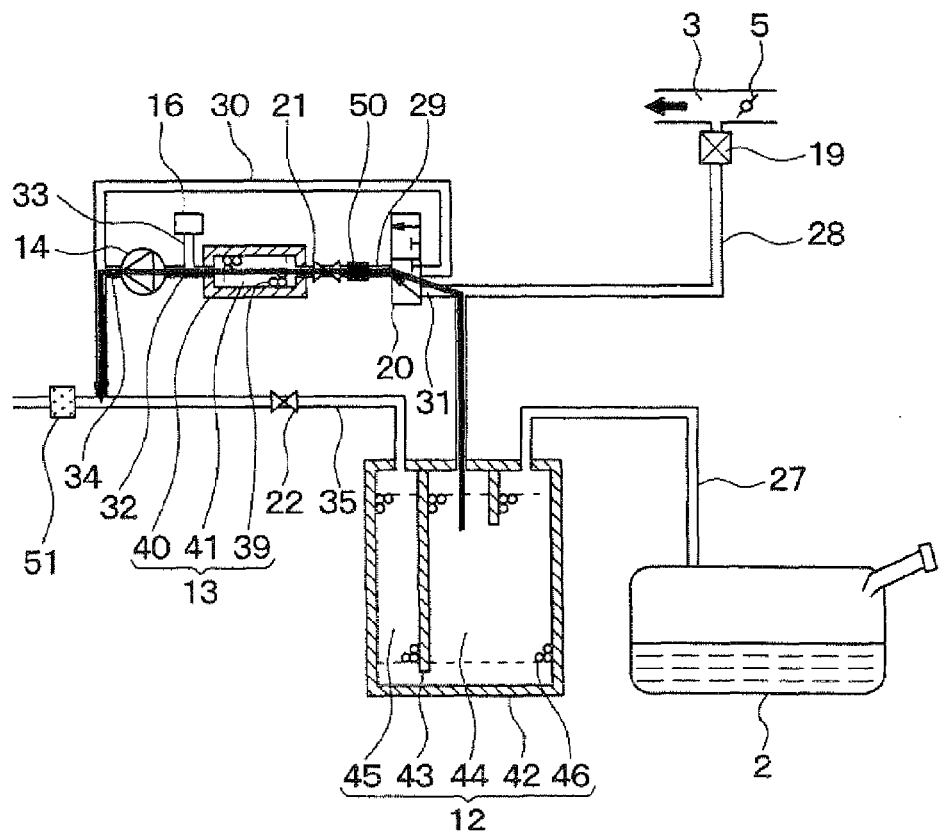
FIG. 11 is a schematic view for explaining the breakthrough detection process and the purge concentration measurement process in the fuel vapor treatment system.

Then, the procedure proceeds to step S208 in which the passage switching valve 20 is switched to the second position. Thereby, since the condition of the valves 19-22 will be in the condition shown in the column of "S208" in FIG. 4, the air-fuel mixture containing fuel vapor flows into the first detection passage 29 from the branch passage 31 as shown in FIG. 11. Therefore, the pressure detected by the pressure sensor 16 is the differential pressure $\Delta P_{Gas}$ according to the fuel vapor concentration D. In step S209, when the differential pressure detected by the pressure sensor 16 becomes stable, the stable value is stored in the memory of the ECU 800 as a second differential pressure $\Delta P_{Gas}$.

In step S210, the computer computes a fuel vapor concentration D when no purge is performed by use of Pt, $\Delta P_{Air}$, $\Delta P_{Gas}$ and the above equation (24). In step S211, the computed fuel vapor concentration D is stored in the memory of the ECU 800.

In step S212, the condition of the valves 19-22 is switched to the condition shown in the column of "FIRST CANISTER OPENING CONDITION" in FIG. 4. In step S213, the pump 14 is stopped and the breakthrough detection process is terminated.

When the answer is YES in step S203, the procedure proceeds to step S213. When the answer is YES is step S206, the procedure proceeds to step S212.

Figure 12:
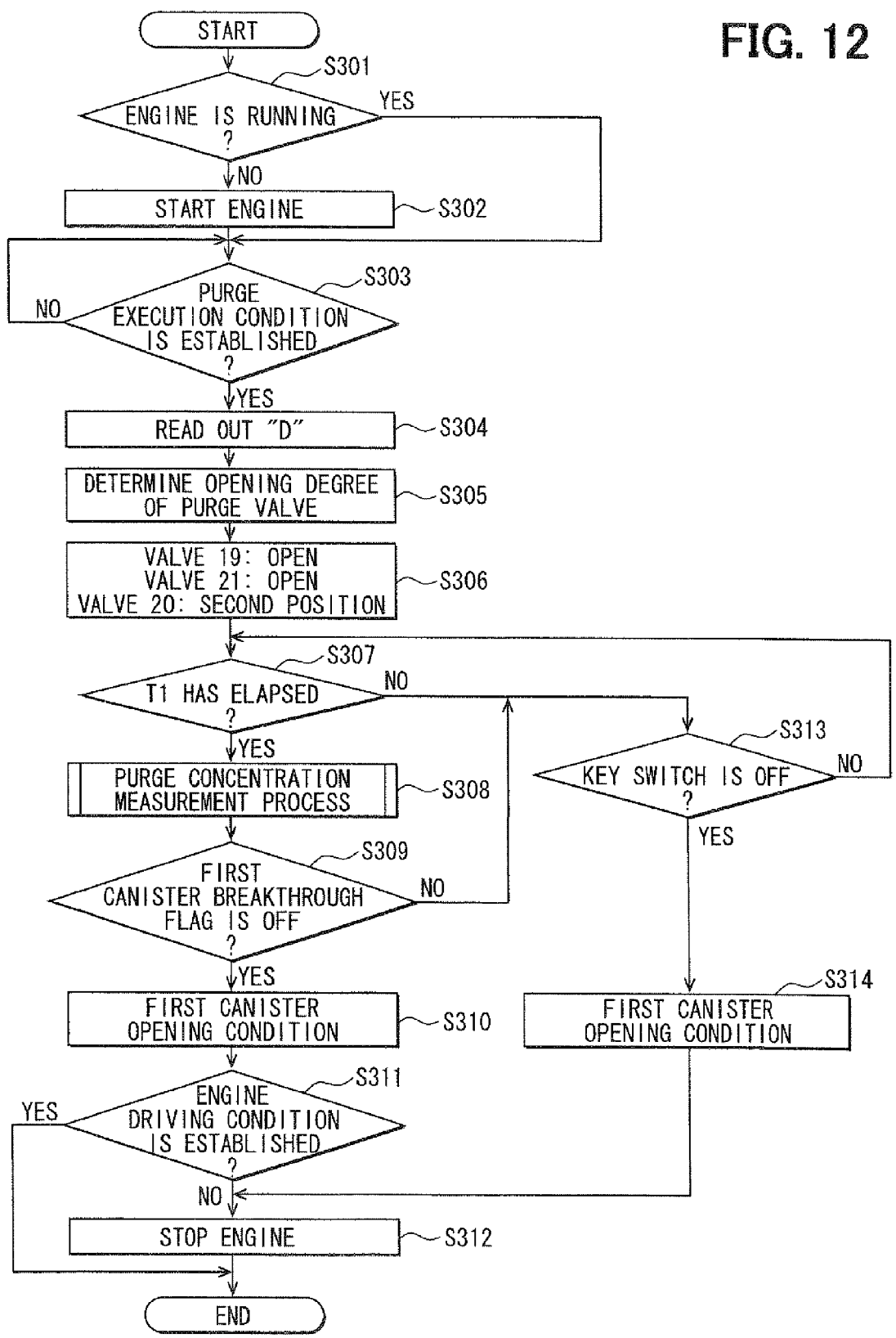
FIG. 12 is a flowchart showing a purge process in the fuel vapor treatment system.

The purge process which is performed in step S104 will be described hereinafter. FIG. 12 is a flowchart showing a purge process executed by the ECU 800. At a starting of the purge process, the condition of the valves 19-22 is in the condition shown in the column of "FIRST CANISTER OPENING CONDITION" in FIG. 4. The first canister 12 is communicated with the atmosphere.

In step S301, the computer determines whether the internal combustion engine 100 is running, When the answer is NO in step S301, the procedure proceeds to step S302 in which the engine 100 is started. Then the procedure proceeds to step S303. At this moment, the driving force of the internal combustion engine 100 is utilized to drive the alternator 700. When the answer is YES in step S301, the procedure proceeds to step S303.

In S303, the computer determines whether a purge execution condition is established. The purge execution condition is established when the engine 100 is started and the engine speed reaches a predetermined value stored in the memory.

When the purge execution condition is not established, the process in S303 is repeated until the purge execution condition is established. When the answer is YES in step S303, the procedure proceeds to step S304. In step S304, the computer reads out the fuel vapor concentration D stored in the memory in step S211. In step S305, the computer determines an opening degree of the purge valve 19 based on the fuel vapor concentration D and the vehicle driving quantity such as accelerator position.

In step S306, the purge valve 19 and the passage opening/closing valve 21 are opened, and the passage switching valve 20 is switched to the second position. Then, the purge process is started. Since the condition of the valves 19-22 is in the condition shown in the column of "S306", the negative pressure in the intake passage 3 is applied to not only the first canister 12 but also the second canister 13 through the first detection passage 29. Thus, the residual fuel vapor in the second canister 13 and the first detection passage 29 is introduced into the purge passage 28, and is purged into the intake passage 3 with the fuel vapor desorbed from the first canister 12.

In step S307, the computer determines whether a preset time T1 has elapsed after the purge process is started. The preset time T1 is required for the first canister 12 to be recovered from the breakthrough situation to the adsorbing situation. The preset time T1 is previously stored in the memory.

When the answer is YES in step S307, the procedure proceeds to step S308 in which a purge concentration measurement process is performed. In the purge concentration measurement process, the computer determines whether the purge of the first canister 12 is completed based on the fuel vapor concentration D of the purged air-fuel mixture. Then, the procedure proceeds to step S309 in which the computer determines whether the fist canister breakthrough flag is OFF. When the answer is YES in step S309, the procedure proceeds to step S310 in which the condition of the valves 19-22 is returned to the condition shown in the column of "FIRST CANISTER OPENING CONDITION" in FIG. 4.

In step S311, the computer determines whether a condition for continuing the driving of the engine 100 is established. Specifically, when the vehicle driving mode is an engine driving mode or a hybrid driving mode, or when the alternator 700 is needed to be driven by the engine 100, the condition for continuing the driving of the engine 100 is established.

When the answer is NO in step S311, the procedure proceeds to step S312 in which the engine 100 is stopped and the purge process is terminated. When the answer is YES in step S311, the purge process is terminated.

When the answer is NO in step S307, the procedure proceeds to step S313 in which the computer determines whether the key switch is turned OFF. When the key switch is ON, the process in step 307 is repeatedly performed until an affirmative determination is made in step S307.

When the answer is NO in step S309, the procedure proceeds to step S313. When the key switch is ON, the processes in steps S307-S309 are repeatedly performed until an affirmative determination is made in step S309.

When the answer is YES in step S312, that is, when the key switch is turned OFF, the condition of the valves 19-22 is returned to the condition shown in the column of "FIRST CANISTER OPENING CONDITION" in FIG. 4. Then, the procedure proceeds to step S312 in which the engine 100 is stopped.

Figure 13:
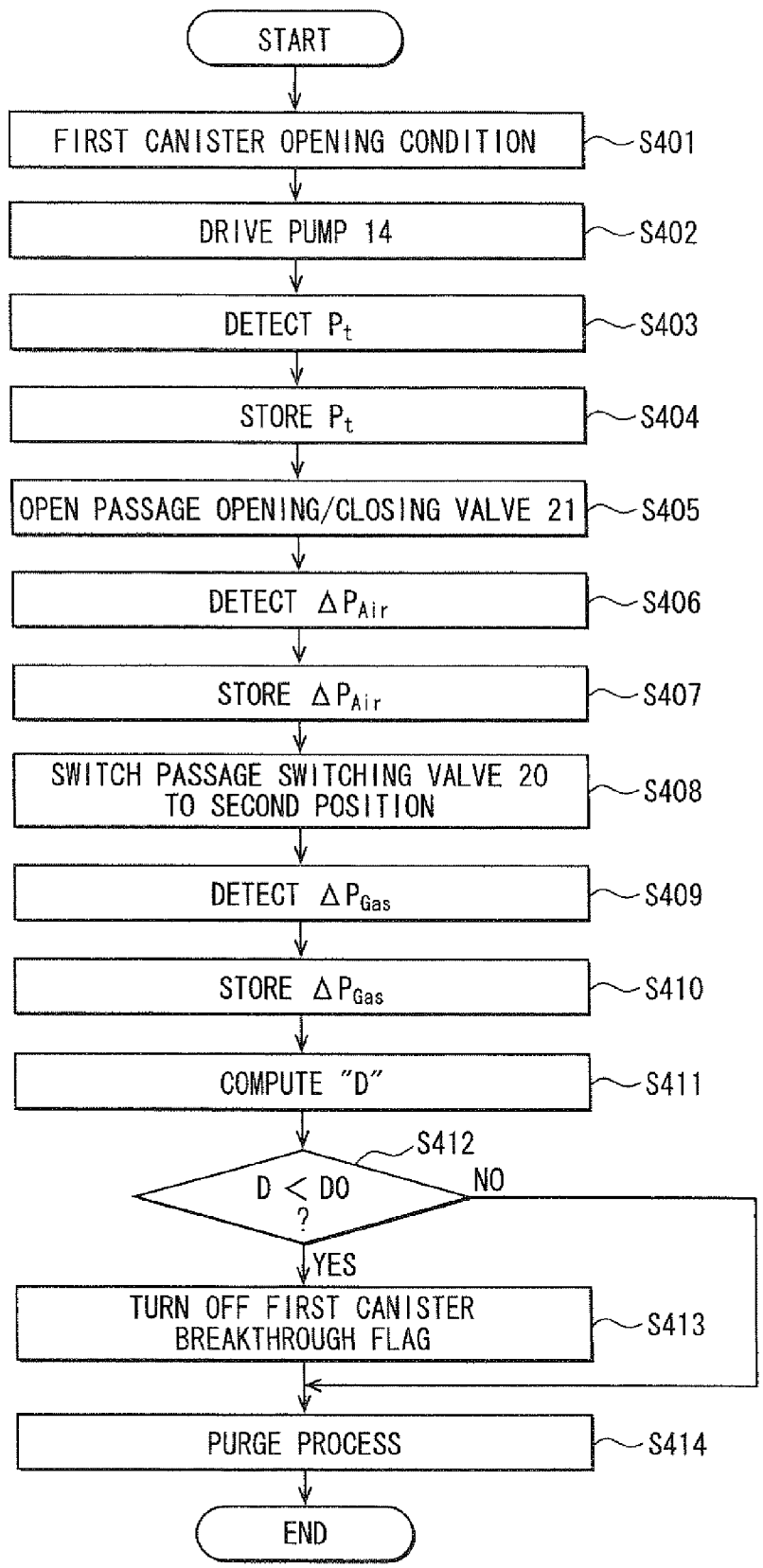
FIG. 13 is a flowchart showing a purge concentration measurement process in the fuel vapor treatment system.

Referring to FIG. 12, the purge concentration measurement process in step S308 will be described. FIG. 13 is a flowchart showing a purge concentration measurement process executed by the ECU 800.

In step S401, the condition of the valves 19-22 is switched to a condition shown in the column of "FIRST CANISTER OPENING CONDITION" in FIG. 4, whereby the first detection passage 29 is closed as shown in FIG. 7. In step S402, the pump 12 is driven to decompress the second detection passage 32. In step S403, the shutoff pressure Pt is detected, and in step S404, the shutoff pressure Pt is stored in the memory of the ECU 800.

In step S405, while the pump 14 is driven, the passage opening/closing valve 21 is opened. Since the condition of the valves 19-22 becomes the condition shown in the column of "S204" in FIG. 4, the air passes the restrictor as shown in FIG. 9. In step S406, the pressure sensor 16 detects the first differential pressure $\Delta P_{Air}$, and in step S407, the first differential pressure $\Delta P_{Air}$ is stored in the memory of the ECU 800.

Then, the procedure proceeds to step S408 in which the passage switching valve 20 is switched to the second position.

Thereby, since the condition of the valves 19-22 will be in the condition shown in the column of "S208" in FIG. 4, the air-fuel mixture which will be purged into the engine 100 flows into the first detection passage 29 from the branch passage 31 as shown in FIG. 11. Therefore, the pressure sensor 16 detects the differential pressure $\Delta P_{Gas}$ according to the fuel vapor concentration D of the air-fuel mixture which will be purged. In step S409, the pressure sensor 16 detects the second differential pressure $\Delta P_{Gas}$, and in step S410, the second differential pressure $\Delta P_{Gas}$ is stored in the memory of the ECU 800.

Figure 14:
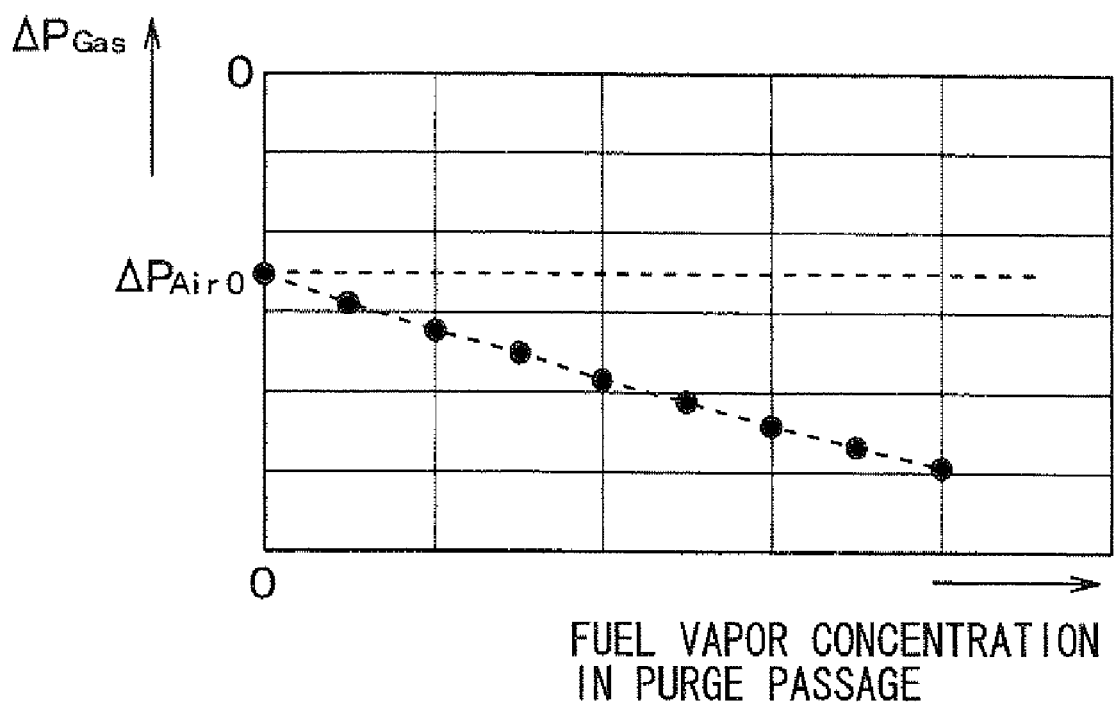
FIG. 14 is a characteristic graph for explaining the purge concentration measurement process in the fuel vapor treatment system.

In step S411, the computer computes a fuel vapor concentration D by use of Pt, $\Delta P_{Air}$, $\Delta P_{Gas}$ stored in the memory in steps S403, 407, 410 and the above equation (24). Since the density of the gas varies according to the fuel vapor concentration, as shown in FIG. 14, as the fuel vapor concentration D of the air-fuel mixture which will be purged increases, the second differential pressure $\Delta P_{Gas}$ detected by the pressure sensor 16 decreases.

In step S412, the computer determines whether the fuel vapor concentration computed in step S411 is less than a permissible concentration D0 previously stored in the memory of the ECU 800 in order to determine whether the purge of the first canister 12 is completed. Specifically, when the fuel vapor concentration D is less than the permissible concentration D0, the computer determines that the pure process in the first canister 12 is completed.

When the answer is YES in step S412, the procedure proceeds to step S413 in which the first canister breakthrough flag is turned OFF.

In step S414, the purge valve 19 and the passage opening/closing valve 21 are opened, and the passage switching valve 20 is switched to the second position. Since the condition of valves 19-22 is in the condition shown in the column of "S306" in FIG. 4, the residual fuel vapor in the second canister 13 and the first detection passage 29 is introduced into the purge passage 28, and is purged into the intake passage 3 with the fuel vapor desorbed from the first canister 12. After the process in step in S414, the purge concentration measurement process is terminated.

When the answer is NO in step S412, that is, when the purge of the first canister 12 is not completed, the procedure proceeds to step S414 in which the purge condition is returned. Then, the procedure goes back to the purge process (refer to FIG. 12), the purge process is performed until an affirmative determination is made in step S307 or step S313.

According to the present embodiment, when the breakthrough is detected in the first canister 12, the internal combustion engine 100 is started to perform the purge process. Thus, a driving frequency of the internal combustion engine 100 is reduced, and it can be avoided to discharge the fuel vapor from the first canister 12 to the atmosphere. Moreover, when the purge completion of the first canister 12 is detected, the internal combustion engine 100 is stopped. Thus, the driving frequency of the internal combustion engine 100 becomes minimum value to avoid the deterioration in fuel economy.

Besides, in step S307 of FIG. 12, the computer determines whether the purge process has been completed based on the elapsed time after the purge process is started. Alternatively, the computer can determine whether the purge process has been completed based on an integrated quantity of the purged fuel vapor which has passed the purge valve 19. This integrated quantity is required for the first canister 12 to be recovered from the breakthrough situation to the adsorbing situation. The integrated quantity is previously stored in the memory.

What is claimed is:

1. A fuel vapor treatment system for a hybrid vehicle having an internal combustion engine and an electric motor, the fuel vapor treatment system comprising:
    a first canister temporarily adsorbing a fuel vapor generated in a fuel tank;
    an open-passage connecting the first canister with atmosphere;
    a purge passage for introducing an air-fuel mixture including the fuel vapor into an intake passage of the internal combustion engine and purging the fuel vapor into the intake passage;
    a first detection passage provided with a restrictor therein;
    a passage switching valve selectively connecting the first detection passage with one of the open-passage and the purge passage;
    a second canister connecting with the first detection passage at an opposite end relative to the passage switching valve across the restrictor in order to adsorb the fuel vapor in the air-fuel mixture which flows therein from the first detection passage;
    a second detection passage connecting with the second canister;
    a gas-flow producing means connecting with the second detection passage to generate a gas-flow therein;
    a pressure detecting means for detecting a pressure determined by the restrictor and the gas-flow producing means;
    a fuel vapor discharge detecting means for detecting a discharge of the fuel vapor from the first canister into the atmosphere based on a pressure detected by the pressure detecting means;
    a purge completion detecting means for detecting a purge completion of the first canister based on the pressure detected by the pressure detecting means
    a purge starting means for starting the internal combustion engine and starting a purge of the fuel vapor when the fuel vapor discharge detecting means detects the discharge of the fuel vapor from the first canister while the internal combustion engine is stopped; and
    a purge stopping means for stopping the internal combustion engine and stopping the purge of the fuel vapor when the purge completion detecting means detects the purge completion of the first canister.

2. A fuel vapor treatment system according to claim 1, wherein
    the fuel vapor discharge detecting means detects the discharge of the fuel vapor from the first canister to the atmosphere based on a pressure detected by the pressure detecting means when the passage switching means connects the first detection passage with the open-passage.

3. A fuel vapor treatment system according to claim 1, wherein the purge completion detecting means detects the purge completion of the first canister based on a pressure detected by the pressure detecting means when the passage switching means connects the first detection passage with the purge passage.

* * * * *